Jan. 13, 1931.  H. ERNST  1,788,761
MACHINE TOOL DRIVE
Filed Feb. 9, 1927   2 Sheets-Sheet 1
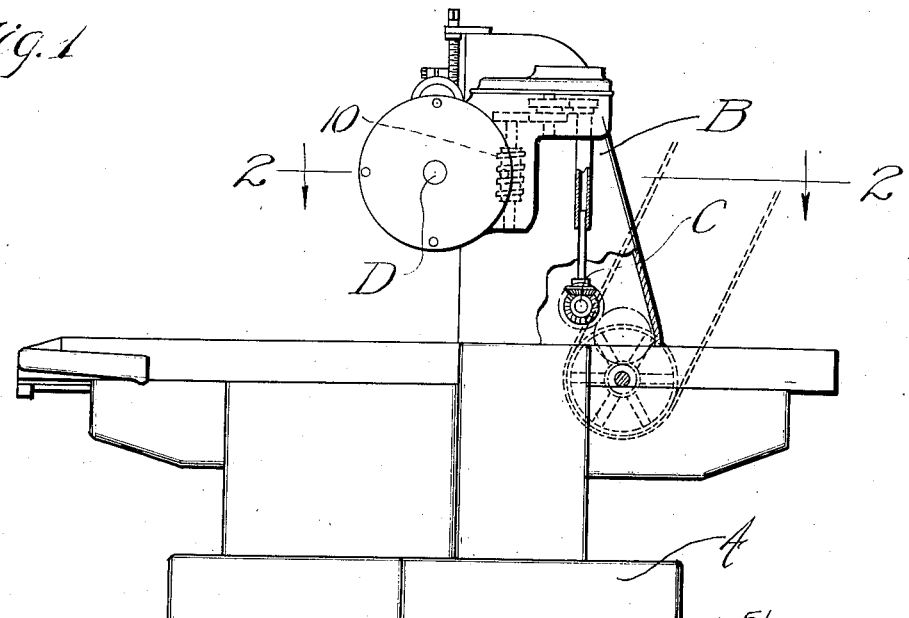
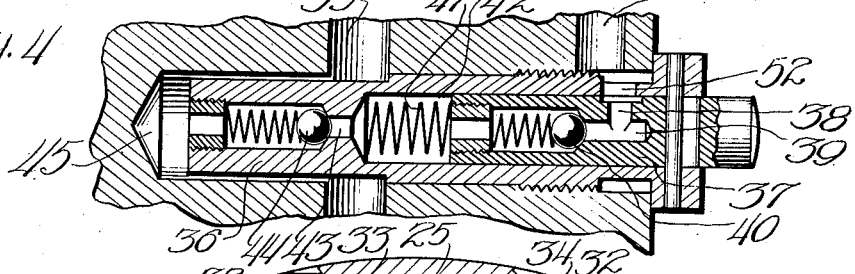
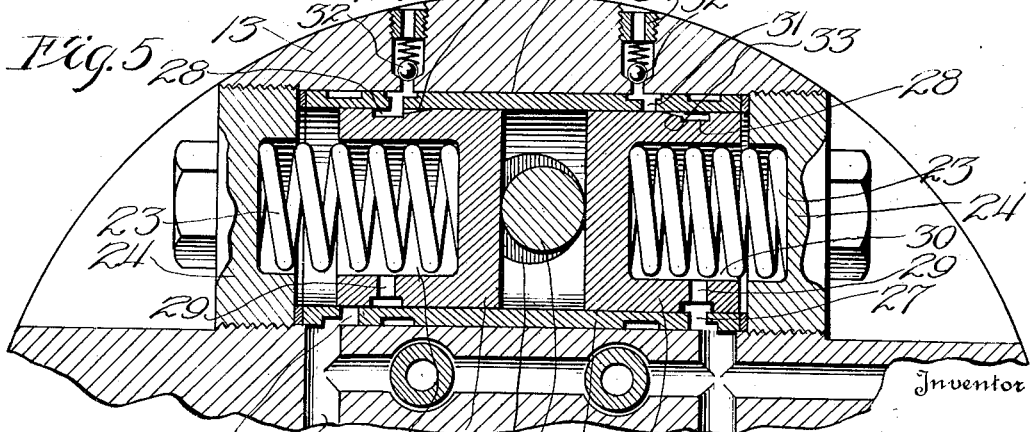
Inventor
Hans Ernst
By
O.H.Parsons
Attorney

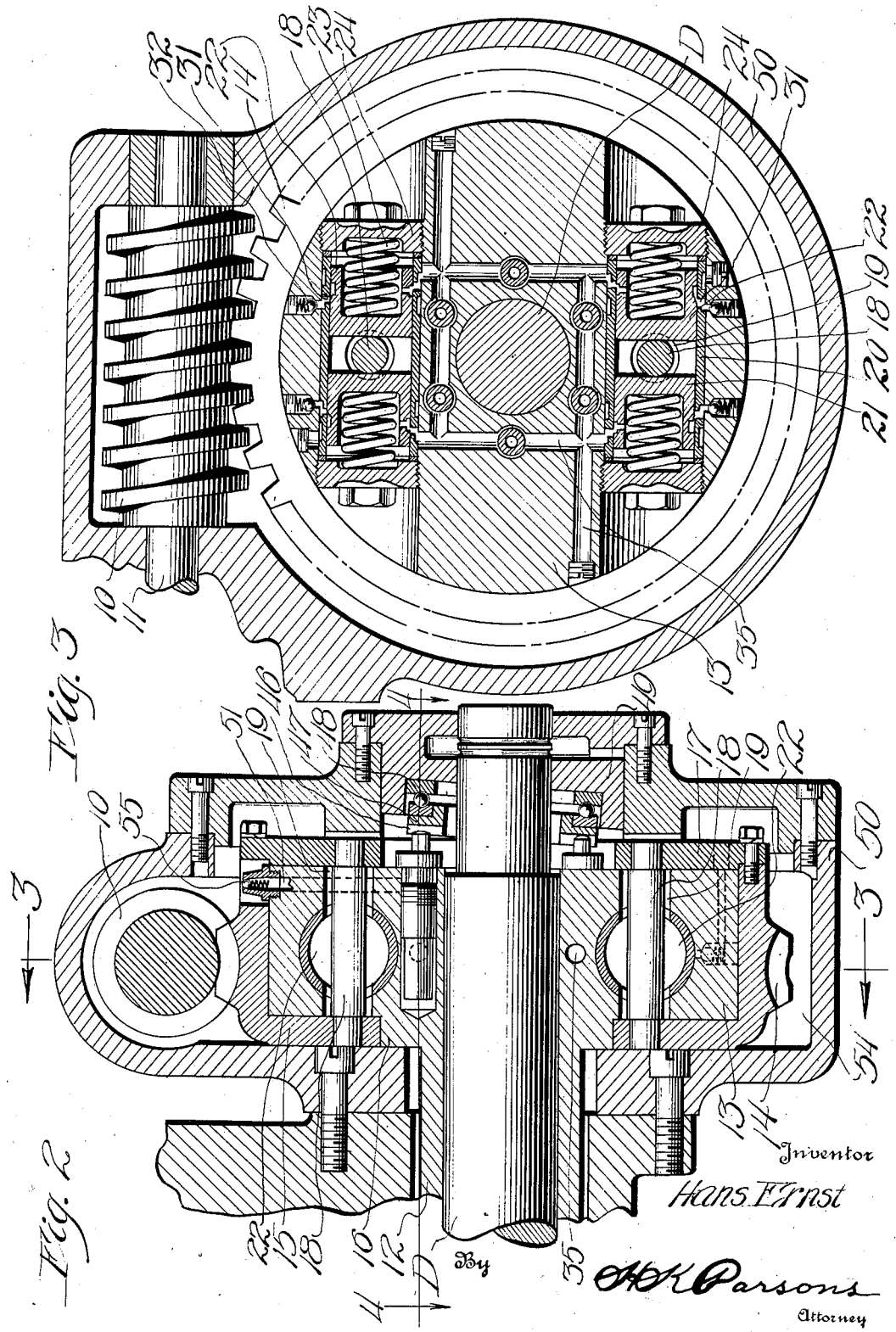

Patented Jan. 13, 1931

1,788,761

UNITED STATES PATENT OFFICE

HANS ERNST, OF CINCINNATI, OHIO, ASSIGNOR TO THE CINCINNATI MILLING MACHINE COMPANY, OF CINCINNATI, OHIO, A CORPORATION OF OHIO

MACHINE-TOOL DRIVE

Application filed February 9, 1927. Serial No. 166,965.

This invention relates to improvements in machine tool drives and has particular reference to a novel and improved form of drive mechanism particularly adapted for use in connection with milling or other cutters, designed to have an intermittent engagement with the work.

One of the objects of the present invention is the provision of a drive embodying a vibration dampener which will prevent the vibrations of intermittent engagement between cutter and work being transmitted in a positive manner to the gear train, thus setting up recurrent strain, chattering, and the like in said mechanism.

A further object of the present invention is the provision of an improved self-contained hydraulic shock absorbing mechanism for use in power transmission.

Another object of the present invention is the provision of a self-contained mechanism of the character mentioned which will automatically build up a cushioning pressure which will counterbalance the resistance momentarily or otherwise exerted against the actuated member.

Other objects and advantages of the present invention should be readily apparent by references to the following specification taken in connection with the accompanying drawings and it will be understood that I may make any modifications in the specific structural details within the scope of the appended claims, without departing from or exceeding the spirit of the invention.

Figure 1 is an elevation of a machine having my improvements embodied therein.

Figure 2 is a sectional view on the line 2—2 of Figure 1.

Figure 3 is a section on line 3—3 of Figure 2.

Figure 4 is an enlarged sectional view through one of the pump members, and,

Figure 5 is an enlarged section through the compensating pistons, showing a shifted position thereof.

In the drawings the letter A designates the base of a milling machine having the column B supporting the power transmission gearing designated as an entirety by the reference character C. This mechanism is adapted to supply driving force to the cutter spindle D for actuation thereof.

Prior to my invention it has been customary in mechanism of this character to employ suitable transmission means such as the worm 10 on shaft 11 for actuation of the cutter. When this is a direct gear drive, however, certain disadvantages are encountered due to the fact that a milling cutter for example, is formed with a plurality of teeth which consequently consecutively, rather than simultaneously engage the work during the feeding operation with the result that there is an irregular application of power through the drive gearing to the cutter spindle, due to the tendency of the spindle to jump ahead between cuts and the temporary retardance, as a new tooth operatively engages the work. At certain feeds and speeds this produces considerable vibration or chatter in the driving mechanism and undue strain on the several power transmitting gears. Also, this intermittent action tends to render the entire machine quite noisy in operation.

It is the purpose of the present invention therefore to obviate these difficulties. This is accomplished by securing on spindle D a sleeve 12 having a flange 13. Loosely mounted on said flange 13 is a worm gear 14 adapted to mesh with the worm 10. This gear 14 has at one side the hub flange 15 fitting the hub 16 of sleeve, while opposed to said flange is the cap plate 17. Flange 15 and plate 17 fit on opposite sides of flange 13 and secure the gear peripherally thereon for movement relative thereto. The parts 15 and 17 are further connected by cross pins 18 extending through slots 19 in the flange 13.

The flange 13 contains the vibration dampening or yielding coupling mechanism for regulating the drive connection between the worm and spindle. This mechanism includes the pair of similar oppositely disposed cylinders 20, there being one of these cylinders for each pin 18. As their structure is identical, a description of one will serve for an understanding of both and it will be evident that if desired either more or less than two could be employed according to the number of connecting pins 18 it is desired to utilize. Disposed within each cylinder 20 are a pair of pistons 21 and 22 on opposite sides of the pin 18 and actuated inwardly by springs 23 bearing against the screw plugs 24 which form the enclosure for cylinder 20 and retain the cylinder sleeve itself in position within the port or passage 25 formed therefor in chordal relation to flange 13 as will be clearly understood by reference to Figures 2 and 3. As the springs 23 exert equal pressure against the pistons they normally tend to keep the pin 18 in a centralized position as indicated in Figure 3.

To further aid in proper positioning of the pistons, use is made of oil or other fluid pressure introducible into the cylinder as through passages 26 and ports 27 in the cylinder walls. The pistons themselves are provided with peripheral grooves as indicated at 28 and have in communication with said grooves the ports 29 for introducing pressure into the hollow interior 30 of the pistons and between the pistons and ends of the cylinders. The cylinders are additionally provided with the outlet ports 31 controlled by check valves 32, these ports being so disposed that under normal conditions the fluid under pressure may pass around groove 28 and through tapered outlet 33 into exhaust port 31 and thence escape through sleeve nut 34 adjacent the check valve, so that undue pressure will not be built up in the cylinders. The normal cushioning pressure in the cylinders tending to retain the pistons in normal centralized position therefore depends on the resistance of the check valves 32.

However, when the resistance to rotation of spindle D exceeds the pressure back of the right hand piston of Figure 5, assuming that the worm gear is being rotated in a clockwise direction, the pin 18 will move toward the right, together with the gear, thus causing a movement of the piston toward the right as is shown in Figure 5. As the piston is moved to the right, ports 27 and 29 will still remain in communication, allowing pressure to pass to the hollow interior 30 of the piston, but outlet 33 will be shifted away from port 31, so that the pressure can no longer escape through the right hand check valve 34. Consequently, pressure will be built up within the piston and cylinder at the right hand side tending to reshift the piston toward the left and with it the pin 18. At the same time that the right hand piston moves to the right the combined action of the pressure in the left hand cylinder and expansion of spring 23 will correspondingly shift piston 21. As this piston shifts its port 29 will move out of alinement with port 27 and the solid end of the piston will serve as a closure for this port, so that the built up pressure will not be active in the left hand end of the cylinder. Also, the groove 28 will be brought into alinement with its relief port 31 so that at any time pressure within the left hand end of the cylinder may pass out through port 27, groove 28 and relief port 31 tending to reduce the pressure in this end of the cylinder. The combined result of this action is that the greater the resistance to rotation of spindle D and consequent shifting of piston 22 to the right, the greater will be the shutting off of escape of pressure from the right hand end of the cylinder and consequent building up of resistant pressure into this end of the cylinder, coupled with reduced pressure at the opposite end of the cylinder, so that there is an hydraulic cushioning effect preventing the vibrations from intermittent resistances being transmitted direct to the driving gears.

This resisting pressure may be created in any desired manner, but preferably use is made of a self-contained pump mechanism and pressure distributing system such as particularly illustrated in Figures 2, 3 and 4 of the drawings. This pressure creating and distributing system includes the interconnecting passages 35 and a plurality of similar pump members, one of which is shown in section in Figure 4. This member comprises the pump cylinder 36 having slidable therein plunger 37 having an inlet port 38, passage 39 and check valve 40. A spring 41 outwardly actuates this plunger. Beyond the compression chamber 42 is a restricted port 43 controlled by an outlet valve 44 controlling flow of fluid into the chamber 45 in communication with the interconnecting ports 35.

The several ends of the plungers 37 project into grooves 46 in the face of the collar 47 rotatably supported through thrust bearing 48 in the cap member 49 of the casing 50 of the present mechanism.

By reference to Figure 2 it will be noted that the thrust bearing 48 is disposed in tilted relation to the axis of spindle D and with one side nearer flange 13 than is its opposite side. As a result, on rotation of the shaft and flange the engagement of the plungers with collar 47 will successively press the plungers inward on their downward movement producing the compression stroke of the pump mechanism, while on the upward movement the springs 41 will force the plungers outward for the suction stroke. It will be noted that casing 50 forms an oil reservoir in which gear 14 and its driving worm 10 operate and that the flange has a plurality of outwardly extending radial passages 51 communicating through ports 52 in the pump cylinders and ports 38 in the plungers with the interior of the plungers so that on the outward stroke fluid from chamber 54 may be drawn in past check valve 55 and check valve 40 to the chamber 42, this outward action being substantially completed, while the inlet passage 51 is below the horizontal position and consequently submerged in oil, even though the chamber be not over half full. Reverse flow of the oil being prevented by the check valve 40 as the plunger is forced inward, the oil in chamber 42 is ejected past valve 44 into chamber 45 and distributing passages 35 to the two pistons equally, in the event that pin 18 is centrally supported thereby. However, in the event that the pin is not so supported, but the parts are in the position shown in Figure 5, flow of the fluid to the inwardly shifted piston is cut off and escape of fluid from the outwardly shifted piston is also cut off with the result that the entire pressure generated by the plurality of plunger pumps is effective within the cylinder end and chamber of the piston exerting the driving force which has been resisted. Consequently, the greater the resistance pressure the more entirely escape of this pressure is shut off and consequently the heavier the pressure which will be built up back of the piston, tending to reshift it to normal position. It will thus be seen that on uneven or intermittent resistance to constant and unfluctuating drive of pin 18, the additional force necessary to counteract this resistance in place of being effected directly through the driving gear train with a hammering action, is initially taken up by the piston and built up by the pressure within the piston, so that the gear 14 itself may have a constant and steady movement irrespective of fluctuations in position of the driving connections or pins 18. The piston mechanism just described therefore serves to dampen these vibrations and prevent regenerative effect thereof.

From the foregoing description it will further be noted that the mechanism just described is an entirely self-contained proposition occupying substantially no greater space than would normally be occupied by the worm gear alone, but that within this space it contains not only the equalizing drive resisting either jumping ahead or retarded movement of the spindle, but also is a self-contained pump mechanism actuated by rotation of the spindle to satisfactorily supply the desired resisting pressure in a simple and effectual manner.

I claim:—

1. A power drive, including a prime mover and a spindle actuable therefrom, and drive connections intermediate the prime mover and spindle, including a slotted member associated with one of said parts, a drive connection loosely engaged in the slot, a motion limiter adjacent the slot, and hydraulic means for building up the resistance of the motion limiter.

2. A power drive, including a prime mover and a spindle actuable therefrom, and drive connections intermediate the prime mover and spindle, including a slotted member associated with one of said parts, a drive connection loosely engaged in the slot, a yieldable motion limiter adjacent the slot, and hydraulic means for building up the resistance of the yieldable motion limiter.

3. A power transmission mechanism, including a prime mover and a spindle, a power transmission line connecting said parts for actuation of the spindle, said transmission including interengaged fixed and yielding abutments, and hydraulic means for building up the resistance of the yieldable abutment.

4. A power transmission, including coaxial rotary members, means for rotating one of said members, means for driving the other member therefrom, including a fixed abutment, a pair of spaced abutments oppositely engaging the fixed abutment, resilient means independently inwardly urging said abutments, and additional means jointly inwardly urging the movable abutments.

5. A power transmission, including coaxial rotary members, means for rotating one of said members, means for driving the other member therefrom, including a fixed abutment, a pair of spaced abutments oppositely engaging the fixed abutment, resilient means independently inwardly urging said abutments, additional means jointly inwardly urging the movable abutments, and automatic means for building up the resistance of either of the movable abutments proportional to the pressure of the fixed abutment thereagainst.

6. A power transmission, including coaxial rotary members, means for rotating one of said members, means for driving the other member therefrom, including a fixed abutment, a pair of spaced abutments oppositely engaging the fixed abutment, resilient means independently inwardly urging said abutments, additional means jointly inwardly urging the movable abutments, and automatic means for building up the resistance of either of the movable abutments proportional to the pressure of the fixed abutment thereagainst, said means including pressure cylinders adjacent the movable abutments, and means actuated by movement of the abutments for varying the flow of actuating fluid into said cylinders.

7. A drive of the character described, including a spindle and a prime mover therefor, and a transmission intermediate said parts, including a pair of coaxial rotary members, a fixed abutment carried by one of said members and capable of limited movement as respects the other member, and means on said other member for controlling the limited movement, including a double end cylinder, a pair of pistons mounted in the ends of the cylinder, the abutment of the other member projecting between said pistons, means for controlling the actuating pressure within opposite ends of the cylinder, including inlet and outlet ports and portions on the pistons selectively controlling the flow of actuating fluid through the ports as the pistons are shifted by engagement with the abutment.

8. A power transmission drive, including coaxial independently rotatable members, and means coupling the members for joint rotation, including a plurality of laterally projected abutments on one of the members and vibration dampening units for engagement with each of said projections carried by the other member for coupling the parts, said units each comprising a cylinder centrally receiving the projection and spaced pistons in the cylinder oppositely engaging the abutment, centralizing springs for forcing the pistons inward in the cylinders, a joint pressure supply pipe for introducing actuating fluid into opposite ends of the cylinder for shifting of the pistons therein, and valve portions on the pistons controlling the flow of fluid into the cylinder ends.

9. A power transmission mechanism, including driving and driven members, a fixed abutment carried by one of said members, a shiftable abutment carried by the other member for interengagement with the first abutment, and hydraulic means actuating the shiftable abutment in the direction of the fixed abutment with a pressure proportional to the resistance to joint movement offered by the fixed abutment.

10. A power transmission mechanism including a prime mover and spindle actuable thereby, a power transmission intermediate said parts, a pair of inter-engaged members in the transmission, a plurality of circumferentially spaced abutment pins carried by one of said members parallel to the axis thereof opposing abutments engaging each abutment pin and carried by the other of said members, means yieldingly urging said second abutments into engagment with their respective abutment pins whereby said opposing abutments may shift to absorb shocks in the transmission line.

11. A power transmission including coaxial rotary members, one of which is supported on the periphery of the other for independent rotary movement, means carried by one of the members preventing independent lateral movement between them, said means also supporting a plurality of abutments, a plurality of pairs of yieldable plungers carried by the other member engaging opposite sides of each abutment forming a lost motion driving connection whereby the transmission of vibrations from the driven member to the driving member will be prevented.

12. In a power transmission, coaxial rotary members, comprising a rotary disk member having the other member journaled on its periphery, flanges formed on the outer member for engaging the opposed faces of the disk, driving pins extending through slots in the disk and fixed at each end in the flanges forming a lost motion driving connection between the two members, resilient means in the disk engaging opposite sides of the pins to centralize them in the slots, and limit the amount of lost motion between the parts.

13. A power transmission including a driven disk member, a driving member journaled thereon having flanges engaging opposite faces of the disk, driving pins fixed in the flanges and extending through slots in the disk, chordal bores in the disk member intersecting the slots, spring pressed centralizing plungers in the bores engaging opposed sides of the pins to form a resilient driving connection between the members.

14. A power transmission having concentric members capable of relative rotation with respect to each other, flanges on one of said members engaging opposed faces in the other, an abutment fixed to said flanges and extending through the interior member, a plurality of chordal bores in the interior member forming cylinders, resiliently mounted pistons working therein engaging opposed sides of said abutment forming a yielding driving connection and a source of hydraulic pressure connected to said cylinders for controlling the yielding connection.

15. A power transmission including coaxial rotary members, means for rotating one of said members, means for driving the other member therefrom including a fixed abutment, a pair of spaced abutments oppositely engaging the fixed abutment, resilient members independently inwardly urging said abutments, additional means to jointly maintain a normal inward pressure on said abutments and automatic means to increase said pressure on the movable abutments proportional to the pressure of the fixed abutments thereagainst.

16. A power transmission mechanism including a driving and driven members, a housing enclosing said members, drive connections intermediate said members including a hydraulic vibration dampener, a self-contained hydraulic system in said housing connected to said dampener including a reservoir, a pump, means for actuating the pump from one of said members for supplying fluid pressure to said dampener and means to return the exhaust fluid therefrom to the reservoir.

17. A power transmission including a driving and a driven member, a housing enclosing said members, means coupling the members for joint rotation including hydraulic vibration dampening units, hydraulic pressure supply means therefor including a plurality of axially parallel plungers, eccentric means for actuating said plungers and channels interconnecting said plungers with said units for joint operation.

18. A power transmission including coaxial independently rotatable members, an abutment fixed on one of said members, resilient plungers mounted in the other of said members engaging opposite sides of said abutment to form a driving coupling, hydraulic cushioning means for each plunger including cylinders having intake and exhaust ports, a source of pressure therefor, means on the plungers to control the ports of their respective cylinders whereby equal pressure will be maintained in the cylinders when the abutment is in normal position and differential centralizing pressures will be created therein when the abutment moves from normal position.

In testimony whereof I affix my signature.

HANS ERNST.